United States Patent
Yu et al.

(10) Patent No.: US 12,301,809 B2
(45) Date of Patent: May 13, 2025

(54) ENCODING AND DECODING METHODS USING INPUT FEATURE MAP PROCESSING FOR QUASI TIME DOMAIN SEQUENCE

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Bingjie Zhu, Dongguan (CN); Hualong Yu, Dongguan (CN); Zhihuang Xie, Dongguan (CN); Zhenyu Dai, Dongguan (CN)

(73) Assignees: ZHEJIANG UNIVERSITY, Hangzhou (CN); GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 90 days.

(21) Appl. No.: 18/132,194

(22) Filed: Apr. 7, 2023

(65) Prior Publication Data

US 2023/0247200 A1    Aug. 3, 2023

Related U.S. Application Data

(63) Continuation of application No. PCT/CN2020/119853, filed on Oct. 7, 2020.

(51) Int. Cl.
H04N 19/124   (2014.01)
H04N 19/136   (2014.01)
(Continued)

(52) U.S. Cl.
CPC ......... *H04N 19/124* (2014.11); *H04N 19/136* (2014.11); *H04N 19/186* (2014.11); *H04N 19/42* (2014.11)

(58) Field of Classification Search
CPC .. H04N 19/124; H04N 19/136; H04N 19/186; H04N 19/42; H04N 19/85
(Continued)

(56) References Cited

U.S. PATENT DOCUMENTS 10,733,767 B2    8/2020   Cho
10,740,865 B2    8/2020   Lee
(Continued)

FOREIGN PATENT DOCUMENTS

CN    101895756 A    11/2010
CN    107392305 A    11/2017
(Continued)

OTHER PUBLICATIONS

International Search Report in the international application No. PCT/CN2020/119853, mailed on Jun. 24, 2021.
(Continued)

*Primary Examiner* — Marnie A Matt
(74) *Attorney, Agent, or Firm* — BAYES PLLC

(57) ABSTRACT

An encoding method, a decoding method, an encoder, a decoder, and a storage medium are provided. The encoding method comprises: determining input feature map data (S201); performing relevant processing on the input feature map data to obtain a plurality of feature sub-maps (S202); reordering the plurality of feature sub-maps to obtain a quasi time domain sequence and corresponding reordering information (S203); and encoding the quasi time domain sequence and the reordering information to generate a bitstream (204).

20 Claims, 5 Drawing Sheets

(51) Int. Cl.
*H04N 19/186* (2014.01)
*H04N 19/42* (2014.01)

(58) Field of Classification Search
USPC .................................................. 375/240.03
See application file for complete search history.

(56) References Cited

U.S. PATENT DOCUMENTS

| | | | |
|---|---|---|---|
| 2017/0332088 A1* | 11/2017 | Merkle | H04N 19/119 |
| 2018/0025257 A1* | 1/2018 | van den Oord | G06F 18/2113 |
| | | | 375/240.14 |
| 2018/0082181 A1 | 3/2018 | Brothers et al. | |
| 2018/0350110 A1 | 12/2018 | Cho et al. | |
| 2018/0365794 A1 | 12/2018 | Lee et al. | |
| 2021/0406582 A1* | 12/2021 | Wang | G06F 18/214 |

FOREIGN PATENT DOCUMENTS

| | | |
|---|---|---|
| CN | 109889839 A | 6/2019 |
| CN | 110494892 A | 11/2019 |
| CN | 108536772 B | 8/2020 |
| WO | 2018221863 A1 | 12/2018 |

OTHER PUBLICATIONS

Written Opinion of the International Search Authority in the international application No. PCT/CN2020/119853, mailed on Jun. 24, 2021.
Choi Hyomin et al: "Deep Feature Compression for Collaborative Object Detection", 2018 25th IEEE International Conference on Image Processing(ICIP), IEEE, Oct. 7, 2018 (Oct. 7, 2018), pp. 3743-3747, XP033454675, DOI: 10.1109/ICIP.2018.8451100, abstract, Section 3.1. 5 pages.
Chen Zhuo et al: "Lossy Intermediate Deep Learning Feature Compression and Evaluation", Proceedings of the 28th ACM Joint Meeting on European Software Engineering Conference and Symposium on the Foundations of Software Engineering, ACM, New York, NY, USA, Oct. 15, 2019 (Oct. 15, 2019), pp. 2414-2422, XP058639643, DOI: 10.1145/3343031.3350849, ISBN: 978-1-4503-7043-1, abstract; figure 4, Sections 3.1, 3.2 and 4.1.3. 9 pages.
Y-K Wang (Qualcomm) et al: "On CMP padding and region-wise packing", 29. JCT-VC Meeting; Oct. 19, 2017-Oct. 25, 2017; Macau; (Joint Collaborative Team on Video Coding of ISO/IEC JTC1/SC29/ WG11 and ITU-T SG. 16 ); No. JCTVC-AC0023, Oct. 3, 2017 (Oct. 3, 2017), XP030118295, abstract, Section 2.2. 9 pages.
Supplementary European Search Report in the European application No. 20956475.6, mailed on Oct. 27, 2023. 11 pages.

* cited by examiner

ENCODING AND DECODING METHODS USING INPUT FEATURE MAP PROCESSING FOR QUASI TIME DOMAIN SEQUENCE

CROSS-REFERENCE TO RELATED APPLICATION

This is a continuation application of International Patent Application No. PCT/CN2020/119853, filed on Oct. 7, 2020, entitled "ENCODING METHOD, DECODING METHOD, ENCODER, DECODER, AND STORAGE MEDIUM", the disclosure of which is hereby incorporated by reference in its entirety.

BACKGROUND

With the development of computer technologies, there are more and more attention in fields related to computer vision. In recent years, image processing technologies have been successfully applied in various walks of life. In a process of encoding and decoding feature maps, feature map data is sent to a traditional video encoder in form of YUV video data after passing through a prequantization module and a repackaging module, to be subject to compression encoding, and a bitstream generated by the traditional video encoder is included in a feature map data bitstream. Then, the bitstream is sent to a traditional video decoder after passing through a de-repackaging module and a dequantization module, to be subject to decoding, so as to recover originally input feature map data.

At present, the repackaging module/the de-repackaging module may have multiple selectable modes, which are respectively a superposition mode with a specified order of feature maps, a tiling mode with a default order or specified order of feature maps, or the like. However, these existing modes still have some defects. For example, in the superposition mode, only a single list is applicable to describe an order of feature channels, so that an encoding efficiency between superimposed feature channels is not high due to incomplete consideration. In the tiling mode, data of multiple channels for a feature are sequentially tiled in an image according to a single list, and the data of multiple channels are closely adjacent to each other, which result in that when the tiled image is encoded by using existing encoding and decoding methods, encoding and decoding efficiencies may not be effectively improved since there is a discontinuity between data of different channels, so that a compression effect of feature map data is not good enough.

SUMMARY

The disclosure relate to the technical field of encoding and decoding, and in particular to an encoding method, a decoding method, an encoder, a decoder, and a storage medium. The disclosure provides an encoding method, a decoding method, an encoder, a decoder, and a storage medium.

Technical solutions of the disclosure may be implemented as follows.

According to a first aspect, an embodiment of the disclosure provides an encoding method, applied to an encoder. The method includes the following operations.

Input feature map data is determined.

Relevant processing is performed on the input feature map data, to obtain multiple feature sub-maps.

Multiple feature sub-maps are reordered, to obtain a quasi time domain sequence and corresponding reordering information.

The quasi time domain sequence and the reordering information are encoded, to generate a bitstream.

According to a second aspect, an embodiment of the disclosure provides a decoding method, applied to a decoder. The method includes the following operations.

A bitstream is parsed, to obtain a quasi time domain sequence and reordering information.

The quasi time domain sequence is de-reordered according to the reordering information, to obtain multiple feature sub-maps.

Relevant processing is performed on multiple feature sub-maps, to obtain reconstructed feature map data.

According to a third aspect, an embodiment of the disclosure provides an encoder, including a first determination unit, a first processing unit, a reordering unit, and an encoding unit.

The first determination unit is configured to determine input feature map data.

The first processing unit is configured to perform relevant processing on the input feature map data, to obtain multiple feature sub-maps.

The reordering unit is configured to reorder multiple feature sub-maps, to obtain a quasi time domain sequence and corresponding reordering information.

The encoding unit is configured to encode the quasi time domain sequence and the reordering information, to generate a bitstream.

According to a fourth aspect, an embodiment of the disclosure provides an encoder, including a first memory and a first processor.

The first memory is configured to store a computer program executable on the first processor.

The first processor is configured to perform the method of the first aspect when executing the computer program.

According to a fifth aspect, an embodiment of the disclosure provides a decoder, including a parsing unit, a de-reordering unit, and a second processing unit.

The parsing unit is configured to parse a bitstream, to obtain a quasi time domain sequence and reordering information.

The de-reordering unit is configured to de-reorder the quasi time domain sequence according to the reordering information, to obtain multiple feature sub-maps.

The second processing unit is configured to perform relevant processing on multiple feature sub-maps, to obtain reconstructed feature map data.

According to a sixth aspect, an embodiment of the disclosure provides a decoder, including a second memory and a second processor.

The second memory is configured to store a computer program executable on the second processor.

The second processor is configured to perform the method of the second aspect when executing the computer program.

According to a seventh aspect, an embodiment of the disclosure provides a computer storage medium, having stored thereon a computer program. The computer program implements the method of the first aspect when being executed by a first processor, or implements the method of the second aspect when being executed by a second processor.

Embodiments of the disclosure provide an encoding method, a decoding method, an encoder, a decoder, and a storage medium. At the encoder side, input feature map data is determined; relevant processing is performed on the input feature map data, to obtain multiple feature sub-maps; multiple feature sub-maps are reordered, to obtain a quasi time domain sequence and corresponding reordering information; and the quasi time domain sequence and the reordering information are encoded, to generate a bitstream. At the decoder side, a bitstream is parsed, to obtain a quasi time domain sequence and reordering information; the quasi time domain sequence is de-reordered according to the reordering information, to obtain multiple feature sub-maps; and relevant processing is performed on multiple feature sub-maps, to obtain reconstructed feature map data.

DETAILED DESCRIPTION

In order to understand characteristics and technical contents of the embodiments of the disclosure more thoroughly, implementations of the embodiments of the disclosure will be described in detail below with reference to the drawings, which are used for reference and illustration only and are not intended to limit the embodiments of the disclosure.

In a video image, a first colour component, a second colour component and a third colour component are generally used to characterize a coding block (CB). The three colour components are a luminance component, a blue chrominance component and a red chrominance component respectively, and specifically, the luminance component is usually represented by a symbol Y, the blue chrominance component is usually represented by a symbol Cb or U, and the red chrominance component is usually represented by a symbol Cr or V. In this way, the video image may be represented in a YCbCr format or may be represented in a YUV format.

Related technical solutions of current feature map encoding and decoding processes are described below.

Figure 1:
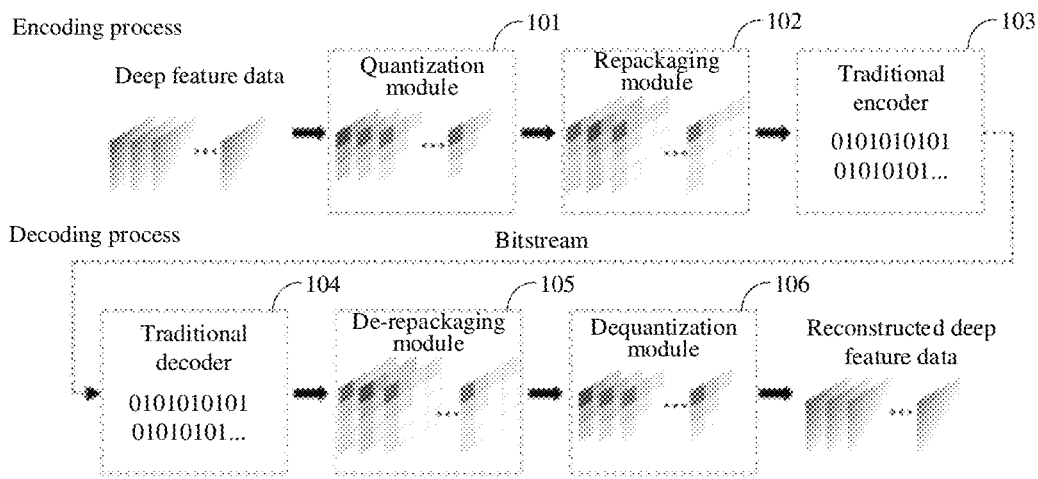
FIG. 1 is schematic structural diagram of a feature map encoding and decoding framework according to the related art.

With reference to FIG. 1, there is illustrated a schematic structural diagram of a feature map encoding and decoding framework according to the related art. As illustrated in FIG. 1, the feature map encoding and decoding framework may include a quantization (pre-quantization) module 101, a repackaging module 102, a traditional video encoder 103, a traditional video decoder 104, a de-repackaging module 105, and a dequantization (pre-dequantization) module 106.

In the encoding process, input deep feature data (Deep Features) is subject to quantization processing performed by the quantization module 101, and then is subject to format conversion performed by the repackaging module 102. For example, originally input Deep Features are converted from a three-dimensional (3D) array into a YUV format meeting input requirements of the traditional video encoder 103, and then are encoded by the traditional video encoder 103, to include the generated bitstream (for example, 010101010101010101 . . . ) in a bitstream of feature map data, and transmit the bitstream to the traditional video decoder 104. In the decoding process, the bitstream is parsed by the traditional video decoder 104 firstly, and then feature map data in the YUV format is converted by the de-repackaging module 105 into feature map data in an array shape, and then is subject to dequantization processing performed by the dequantization module 106, so that reconstructed deep feature data (Reconstructed Deep Features) may be recovered.

That is, the feature map encoding and decoding framework mainly includes three parts, i.e., the quantization module 101/the dequantization module 106, the repackaging module 102/the de-repackaging module 105, the traditional video encoder 103/the traditional video decoder 104. Specific contents of the modules are as follows.

For the quantization module 101/the dequantization module 106, it needs to quantize originally input feature map data when the feature map data is of a floating-point type, so that the feature map data is converted into data of an integer type meeting input requirements of the traditional video encoder.

For the repackaging module 102/the de-repackaging module 105, the repackaging module 102 converts the originally input feature map data from the 3D array into the YUV format meeting input requirements of the traditional video encoder. Furthermore, an encoding efficiency of the traditional video encoder on the feature map data may be improved by changing combination modes of the feature map data. Here, the repackaging module 102/the de-repackaging module 105 may have multiple selectable modes, which are respectively a superposition mode with a specified order of feature maps, a tiling mode with a default order or specified order of feature maps, or the like.

For the superposition mode with a specified order of feature maps, in this mode, each channel of the feature map corresponds to a picture in input data of the traditional video encoder. Height and width of the feature map are filled to height and width meeting input requirements of the traditional video encoder respectively. A channel order of the feature map data is recorded by repack_order_list, and contents in the repack_order_list may be default to be a default order array (for example, [0, 1, 2, 3, . . . ]).

For the tiling mode with a default order or specified order of feature maps, in this mode, multiple channels of the feature map are tiled and spliced into a two-dimensional (2D) array, to be used as a picture in input data of the traditional video encoder. Height and width of the spliced array is filled to height and width meeting input requirements of the traditional video encoder respectively. A splicing order is a channel order of original feature map data, sequential arrangement is preferred in the width direction and then the high direction of the array, and after a current picture is fully tiled, a next picture is created to continue to be tiled, until all the channels of the feature map are tiled. A channel order of the feature map data is recorded by repack_order_list, and contents thereof may be default to be a default order array (for example, [0, 1, 2, 3, . . . ]).

Furthermore, for the traditional video encoder 103/the traditional video decoder 104, feature map array data after quantization and repackaging processing is sent into the traditional video encoder 103 in the YUV format, to be subject to compression encoding, and a bitstream generated by the traditional video encoder 103 is included in a feature map data bitstream. Exemplarily, for a video encoder of H.265/High Efficiency Video Coding (HEVC), the feature map array data will be input in a 4:0:0 format, and for a video encoder of a 3rd Audio Video coding Standard (AVS 3), the feature map array data will be input in a 4:2:0 format.

However, these existing modes still have some defects. In the superposition mode, only a single list is applicable to describe an order of feature channels, and since the order of feature channels is not optimally arranged according to correlation between the feature channels at present, and reference relationships between the feature channels in the video encoder and decoder are not guided and designed, so that an encoding efficiency between superimposed feature channels is not high due to incomplete consideration. Furthermore, in the tiling mode, data of multiple channels for a feature are sequentially tiled in an image according to a single list, and the data of multiple channels are closely adjacent to each other, which result in that when the tiled image is encoded by using existing encoding and decoding methods, a block division operation divides the data of multiple channels into the same encoding unit. At this time, since there is a discontinuity between data of different channels, there is a poor correlation between data of different channels in the same encoding unit, so that efficiencies of the existing encoding and decoding methods cannot be effectively implemented, and a compression effect of the feature data is not good enough.

Based on this, the embodiments of the disclosure provide an encoding method. A basic idea of the encoding method is: determining input feature map data; performing relevant processing on the input feature map data, to obtain multiple feature sub-maps; reordering multiple feature sub-maps, to obtain a quasi time domain sequence and corresponding reordering information; and encoding the quasi time domain sequence and the reordering information, to generate a bitstream. The embodiments of the disclosure further provide a decoding method. A basic idea of the decoding method is: parsing a bitstream, to obtain a quasi time domain sequence and reordering information; and de-reordering the quasi time domain sequence according to the reordering information, to obtain multiple feature sub-maps; and performing relevant processing on multiple feature sub-maps, to obtain reconstructed feature map data. In this way, multiple feature sub-maps are reordered, correlation information between the feature sub-maps is fully utilized, and a reference relationship between the feature sub-maps may be optimized, so that not only compression efficiency of the feature map data is improved, but also encoding and decoding efficiencies of the feature map data are improved.

The embodiments of the disclosure will be described in detail below with reference to the drawings.

It should be noted that before the detailed description, terms "first", "second", "third", or the like mentioned throughout the description are merely intended to distinguish different features, and do not have functions of defining priorities, sequences, size relationships, or the like.

In an embodiment of the disclosure, an encoding method provided in the embodiment of the disclosure is applied to a video encoding device, i.e., an encoder. Functions implemented by the method may be implemented by a first processor in the encoder calling a computer program, of course, the computer program may be stored in a first memory, and it may be seen that the encoder includes at least the first processor and the first memory.

Figure 2:
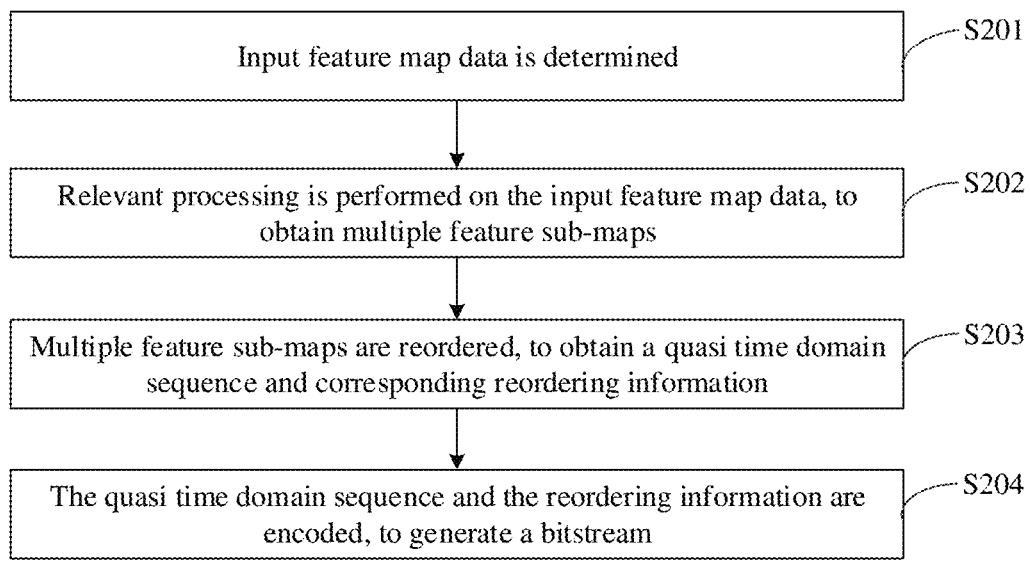
FIG. 2 is a schematic flowchart of an encoding method according to an embodiment of the disclosure.

With reference to FIG. 2, there is illustrated a schematic flowchart of an encoding method according to an embodiment of the disclosure. As illustrated in FIG. 2, the method may include the following operations S201 to S204.

In operation S201, input feature map data is determined.

It should be noted that the encoding method may be applicable to an encoder of an H.265/HEVC standard, or applicable to an encoder of an H.266/Versatile Video Coding (VVC) standard, or even applicable to encoders of other standards, such as an encoder of an AVS standard, an encoder of an Essential Video Coding (EVC) standard, or the like, which are not specifically limited in the embodiments of the disclosure.

It should also be noted that the feature map data refers to feature data extracted after an image or a video is input into a preset neural network model. Specifically, in some embodiments, the operation of determining input feature map data includes the following operations.

A to-be-processed image is obtained.

Feature extraction is performed on the to-be-processed image through a preset neural network model, to obtain the input feature map data which includes feature data of multiple channels.

Here, the preset neural network model is usually a Convolutional Neural Network (CNN) model. CNN is a kind of feed forward neural network including convolution computation and having a deep structure, and is one of representative algorithms for deep learning. CNN has a representation learning capability, and may perform shift-invariant classification on input information according to a hierarchical structure thereof, and thus is also referred to as a "Shift-Invariant Artificial Neural Network (SIANN)". The neural network has been developed to a deep learning phase. Deep learning is a branch of machine learning, and is an algorithm attempting to perform high-level abstraction on data by using multiple processing layers including complex structures or composed of multiple non-linear transformations, a powerful expression capability thereof makes it have a good effect on performance of video and image processing.

That is, in the embodiment of the disclosure, feature map data is used as an input, and the input feature map data is feature data extracted from a network intermediate layer after the to-be-processed image passes through the preset neural network model. It should be noted that the to-be-processed image mentioned here may refer to an image, or may refer to a video picture, which are not specifically limited in the embodiments of the disclosure.

Furthermore, the input feature map data may be in a tensor shape or an array shape. For an image with a width W1 and a height H1, size of its corresponding feature map data may be represented in a tensor shape (C, W, H). Here C is the number of channels, W is a width of a feature tensor, H is a height of the feature tensor, and W and H mentioned here are feature tensor sizes.

In some embodiments, the method may further include the following operations when the input feature map data is in a tensor shape.

Shape conversion is performed on the feature data of multiple channels in the input feature map data respectively, to obtain multiple first feature data, here each channel corresponds to a respective one of the first feature data, and the first feature data is an array shape.

Multiple first feature data are determined as the input feature map data.

That is, when the input feature map data is in the tensor shape, shape conversion needs to be performed on the input feature map data, to convert the input feature map data into an array shape, so as to obtain multiple first feature data, each of which is in the array shape. At this time, multiple first feature data may be determined as the input feature map data.

In operation S202, relevant processing is performed on the input feature map data, to obtain multiple feature sub-maps.

It should be noted that the relevant processing may include quantization processing, filling processing, shape conversion processing, or the like. Specifically, in some embodiments, the operation of performing relevant processing on the input feature map data, to obtain multiple feature sub-maps may include the following operations.

Multiple first feature data are quantized respectively, to obtain multiple second feature data.

Multiple second feature data are filled respectively, to obtain multiple third feature data.

Shape conversion is performed on multiple third feature data respectively, to obtain multiple feature sub-maps.

That is, for multiple first feature data, the first feature data corresponding to each channel may be quantized, and the quantized feature data is determined as the second feature data, here the second feature data is also in an array shape; the second feature data corresponding to each channel is filled, and the filled feature data is determined as the third feature data, here the third feature data is also in an array shape; and finally, the third feature data in the array shape may be converted into a feature sub-map shape, to obtain a feature sub-map corresponding to each channel. It should be noted that for two processing operations, i.e., quantization and filling, an execution order may be quantization and then filling, or may be filling and then quantization, and the embodiments of the disclosure are described by example of quantization and then filling, but the execution order is not specifically limited.

Furthermore, the operation of quantizing multiple first feature data respectively, to obtain multiple second feature data may include the following operations.

A minimum value and a maximum value are selected from the first feature data corresponding to each channel, based on multiple first feature data.

Second feature data corresponding to each channel is determined by using a first calculation model according to the first feature data corresponding to each channel, the minimum value and the maximum value, to obtain multiple second feature data.

It should be noted that for quantizing the feature data, in a specific example, a minimum value (represented by $x_{min}$) and a maximum value (represented by $x_{max}$) may be queried. Here, $x_{min}$ refers to a minimum value from the first feature data of a single channel, and $x_{max}$ refers to a maximum value from the first feature data of a single channel. At this time, a quantization formula (i.e., the first calculation model) is as follows.

$$\hat{y}_{ij} = \text{int}\left[\frac{x_{ij} - x_{min}}{x_{max} - x_{min}} * (2^n - 1)\right] \quad (1)$$

Here, $x_{ij}$ represents data at an i-th row and j-th column in an array (H, W) corresponding to the unquantized first feature data, $x_{min}$ represents a minimum value in the array (H, W) corresponding to the unquantized first feature data, $x_{max}$ represents a maximum value in the array (H, W) corresponding to the unquantized first feature data, $\hat{y}_{ij}$ represents data at an i-th row and j-th column in an array (H, W) corresponding to the quantized second feature data, n represents a number of bits, and int[ ] represents an integralization function.

In another specific example, a logarithmic fixed-point formula may be used at this time. Quantization functions to shape floating-point data into fixed-point data. At this time, the quantization formula may be replaced by a logarithmic fixed-point formula, and the logarithmic fixed-point formula is as follows.

$$\hat{y}_{ij} = \text{int}\left[\frac{\log_2(1 + x_{ij})}{\max\_\text{num}} \times (2^{BitDepth} - 1)\right] \quad (2)$$

Here, $x_{ij}$ represents data at an i-th row and j-th column in an array (H, W) corresponding to the unquantized first feature data, $\hat{y}_{ij}$ represents data at an i-th row and j-th column in an array (H, W) corresponding to the quantized second feature data, that is, $x_{ij}$ and $\hat{y}_{ij}$ represent original data and fixed-point data respectively, max_num represents a maximum value in the feature data $\log_2(1+x_{ij})$ after logarithmic conversion, BitDepth represents a number of fixed-point bits, $\log_2(\bullet)$ operation returns a logarithmic value with 2 as the bottom for an input, and int[ ] operation returns an integer value closest to an input value.

Furthermore, for $x_{min}$ and $x_{max}$, the minimum value ($x_{min}$) and the maximum value ($x_{max}$) corresponding to each channel also need to be transmitted to a decoder to be used by the decoder. Therefore, in some embodiments, the method may further include that the minimum value and the maximum value corresponding to each channel are written into the bitstream.

Furthermore, the operation of filling multiple second feature data respectively, to obtain multiple third feature data may include the following operations.

Second feature data corresponding to each channel is filled by using a second calculation model based on multiple second feature data, and third feature data corresponding to each channel is determined, to obtain multiple third feature data.

It should be noted that for filling the quantized second feature data, i.e., the array (H, W), in a specific example, duplicated boundary values may be filled on the right side and bottom of the array, and at this time, a filling formula (i.e., the second calculation model) is as follows.

$$\begin{cases} \hat{H} = ((H + \alpha) \gg 3) \ll 3, & \text{if } (H \bmod \alpha \neq 0) \\ \hat{W} = ((W + \alpha) \gg 3) \ll 3, & \text{if } (W \bmod \alpha \neq 0) \end{cases} \quad (3)$$

Here, (H, W) represents an array size corresponding to the unfilled second feature data, ($\hat{H}$, $\hat{W}$) represents an array size corresponding to the filled third feature data, mod represents taking a remainder, ">>" and "<<" represent bit operators, ">>" is a right shift operator and "<<" is a left shift operator, a represents a filling constant required by a specific input size of the video encoder.

Furthermore, the operation of performing shape conversion on multiple third feature data respectively, to obtain multiple feature sub-maps may include the following operations.

Third feature data corresponding to each channel is converted from an array shape into a feature sub-map shape based on multiple third feature data, and a feature sub-map corresponding to each channel is determined, to obtain multiple feature sub-maps.

It should be noted that after obtaining quantized and filled array (i.e., the third feature data) of each channel, it may be converted from the array shape into the feature sub-map shape, to obtain a feature sub-map corresponding to each channel, so that multiple feature sub-maps corresponding to multiple channels may be obtained.

It should also be noted that in the embodiment of the disclosure, not all of quantization processing, filling processing, shape conversion processing, or the like are essential processing operations, and these operations are optional operations. In an embodiment, when the input feature map data is data of an integer type, quantization processing may not be required at this time, and only relevant processing such as filling and shape conversion needs to be performed; or, when a size of the non-filled array has met requirements of an input size of the video encoder, filling processing may not be required either, which are not limited here.

In operation S203, multiple feature sub-maps are reordered, to obtain a quasi time domain sequence and corresponding reordering information.

It should be noted that the method may further include the following operation after obtaining multiple feature sub-maps. An initial ordering mode of multiple feature sub-maps is set as an arrangement according to an order of channel serial numbers.

In this way, since the initial ordering mode does not consider correlation between the feature sub-maps, reordering of multiple feature sub-maps is needed. Specifically, in some embodiments, the operation of reordering multiple feature sub-maps, to obtain the quasi time domain sequence may include the following operations.

A target feature sub-map is determined from multiple feature sub-maps, and the target feature sub-map is set as an element at a zeroth bit of each of at least one sequence.

A (i+1)-th remaining feature sub-map set is determined, here the (i+1)-th remaining feature sub-map set includes remaining feature sub-maps except feature sub-maps arranged at first i bits of each of the at least one sequence, i is an integer greater than or equal to 0.

In response to the (i+1)-th remaining feature sub-map set being not empty, a distance value between each feature sub-map in the (i+1)-th remaining feature sub-map set and a feature sub-map arranged at an i-th bit of each of the at least one sequence is calculated, at least one feature sub-map is determined according to multiple calculated distance values, and the determined at least one feature sub-map is correspondingly set as an element at a (i+1)-th bit of each of the at least one sequence.

After operating i to become i+1, the process returns to the operation of determining the (i+1)-th remaining feature sub-map set, until the (i+1)-th remaining feature sub-map set is empty.

After obtaining the at least one sequence with a feature sub-map shape, shape conversion is performed on the at least one sequence, to obtain the quasi time domain sequence.

It should be noted that the operation of correspondingly setting the determined at least one feature sub-map as the element at the (i+1)-th bit of each of the at least one sequence when i is equal to 0 may include the following operations.

A first remaining feature sub-map set which includes remaining feature sub-maps except the target feature sub-map, is determined.

A distance value between each feature sub-map in the first remaining feature sub-map set and the target feature sub-map is calculated, at least one feature sub-map is determined according to multiple calculated distance values, and the determined at least one feature sub-map is correspondingly set as an element at a first bit of each of the at least one sequence.

The operation of correspondingly setting the determined at least one feature sub-map as the element at the (i+1)-th bit of each of the at least one sequence when i is equal to 1 may include the following operations.

A second remaining feature sub-map set which includes remaining feature sub-maps except the target feature sub-map and a feature sub-map arranged at a first bit of each of the at least one sequence, is determined.

A distance value between each feature sub-map in the second remaining feature sub-map set and the feature sub-map arranged at the first bit of each of the at least one sequence is calculated, at least one feature sub-map is determined according to multiple calculated distance values, and the determined at least one feature sub-map is correspondingly set as an element at a second bit of each of the at least one sequence.

In this way, after continuing to operate i to become i+1, the above operations are repeated, until the (i+1)-th remaining feature sub-map set is empty. It should be noted that there may be the same or different number of feature sub-maps in each of the at least one sequence, which are not specifically limited in the embodiments of the disclosure.

It should also be noted that when a distance value between each feature sub-map in the (i+1)-th remaining feature sub-map set and a feature sub-map arranged at an i-th bit of each of the at least one sequence is calculated, the calculated distance value may be an L1 distance or L2 distance, or even another distance. A formula of calculating the L1 distance is shown in formula (4), and a formula of calculating the L2 distance is shown in formula (5).

$$d_1(I_1,I_2)=\Sigma_p|I_1^P-I_2^P| \quad (4)$$

$$d_2(I_1,I_2)=\sqrt{\Sigma_p(I_1^P-I_2^P)^2} \quad (5)$$

Here, each of $I_1$ and $I_2$ represents a p-dimensional vector, for example, $I_1$=[0, 1], $I_2$=[1, 0], then p=2, and what obtained by calculation are $d_1$ ($I_1$, $I_2$)=2, and $d_2$ ($I_1$, $I_2$)=$\sqrt{2}$. Taking a 2D space as an example, the L1 distance represents a sum of an absolute value of a first dimensional difference plus an absolute value of a second dimensional difference, which may be imagined as a sum of lengths of two right-angle sides of a right-angle triangle; the L2 distance represents a sum of a square of a first dimensional difference plus a square of a second dimensional difference and then solving a square root of the sum, which may be imagined as a length of a hypotenuse of a right-angle triangle according to the Pythagorean theorem.

Furthermore, the operation of determining at least one feature sub-map according to multiple calculated distance values may include the following operations. At least one distance value is selected from multiple calculated distance values according to a minimum value selection strategy. The at least one feature sub-map is determined according to the selected at least one distance value.

That is, when i is equal to 0, at least one feature sub-map with a closest distance from the target feature sub-map is selected and used as an element at a first bit of each sequence; when i is equal to 1, at least one feature sub-map with a closest distance from the feature sub-map arranged at the first bit of each sequence is selected and used as an element at a second bit of each sequence. Then, after operating i to become i+1, the above operations are repeated, until the (i+1)-th remaining feature sub-map set is empty.

At this time, after obtaining the at least one sequence, shape conversion of the at least one sequence is required due to a shape of a feature sub-map at the at least one sequence bit, to convert the at least one sequence from the feature sub-map shape into a YUV shape, so as to obtain the quasi time domain sequence. Here, the YUV shape refers to using a YUV format for description, and thus the quasi time domain sequence may also be referred to as a YUV sequence.

Furthermore, the target feature sub-map may be a center point feature sub-map. In some embodiments, the operation of determining the target feature sub-map from multiple feature sub-maps may include the following operations.

Multiple feature sub-maps are clustered, to obtain at least one class.

A center point of each of the at least one class is determined, to obtain at least one center point.

A center point feature sub-map is determined from multiple feature sub-maps according to the at least one center point, here the center point feature sub-map represents a feature sub-map in multiple feature sub-maps which has a minimum distance value from a center point of the at least one center point.

The center point feature sub-map is determined as the target feature sub-map.

That is, after obtaining multiple feature sub-maps, multiple feature sub-maps may be clustered to obtain at least one class, and a center point of each of the at least one class is determined, and then a feature sub-map with a minimum distance value with respect to a center point of the at least one center point is selected as the center point feature sub-map, that is, the target feature sub-map of the embodiment of the disclosure.

Figure 3:
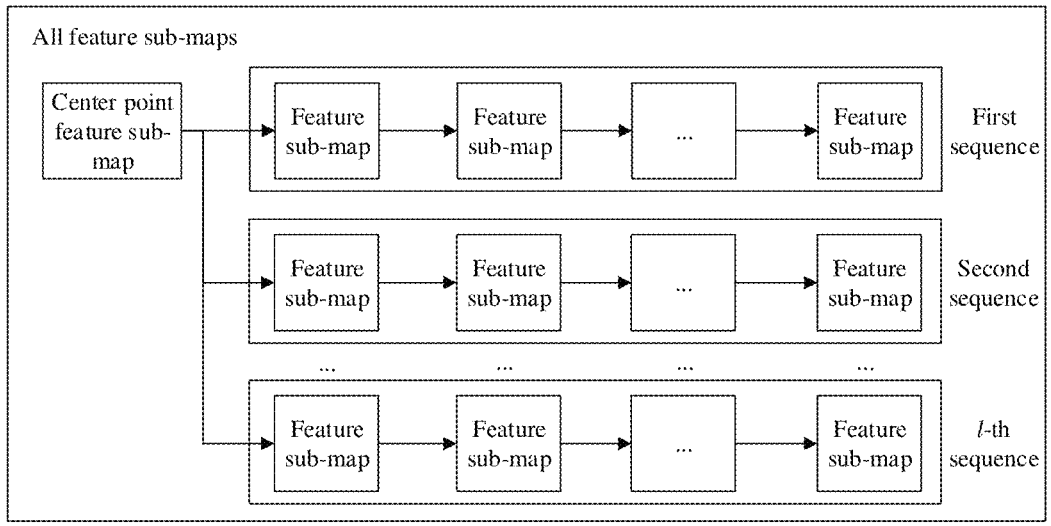
FIG. 3 is a schematic structural diagram of a reordering result representation according to an embodiment of the disclosure.

Exemplarily, as illustrated in FIG. 3, there is illustrated a schematic structural diagram of a reordering result representation according to an embodiment of the disclosure. In FIG. 3, the target feature sub-map is the center point feature sub-map, and there are l sequences in total. Here, the l sequences share the same center point feature sub-map, that is, a zeroth bit of each of the l sequences is set as the center point feature sub-map. Assuming that there are C feature sub-maps in total, distance value between each of the remaining C−1 feature sub-maps and the center point feature sub-map is calculated, and the closest l feature sub-maps are selected to be arranged after the center point feature sub-map and then used as the first bit of each sequence. Then, distance value between each of the remaining C−1−l feature sub-maps and the feature sub-map arranged at the first bit of each sequence is calculated, and the closest l feature sub-maps are selected to be arranged at a second bit of each sequence. The previous operation is repeated, until all of the C feature sub-maps are reordered (there may be different number of feature sub-maps of each of the l sequences), and the obtained reordering result is illustrated in FIG. 3.

It should also be noted that after reordering multiple feature sub-maps, reordering information corresponding to the quasi time domain sequence may be obtained, that is, channel serial numbers corresponding to feature sub-maps of each reordered sequence are recorded, to be transmitted to the decoder for recovery by post-processing. In some embodiments, the method may further include the following operations.

At least one list is set, each of the at least one list stores channel serial numbers corresponding to feature sub-maps placed in each of the at least one sequence.

The reordering information is obtained according to the at least one list.

In other words, the reordering information may include at least one list, that is, the reordering information may store information in form of a list, as illustrated in a formula below.

$$\text{List}^l[c]=X \tag{6}$$

Here, X represents a channel serial number before ordering corresponding to a feature sub-map which is arranged at a c-th bit after an l-th sequence is reordered, and $\text{List}^l[\ ]$ represents a reordering information list of the l-th sequence.

Not only channel serial numbers corresponding to at least two feature sub-maps are recorded in each of the at least one list, but also serial numbers of at least two feature sub-maps in the sequence are recorded in each of the at least one list. Furthermore, feature sub-maps in the same sequence may refer to each other, and feature sub-maps in different sequences may not refer to each other. In this way, reordering information of feature sub-maps with similar contents may be described in one sequence, and reordering information of feature sub-maps with large different contents are described in different sequences, to ensure reference between similar feature sub-maps and avoid reference between large different feature sub-maps, so that during encoding, the feature sub-maps may refer to each other to improve the encoding efficiency by using inter prediction.

In operation S204, the quasi time domain sequence and the reordering information are encoded, to generate a bitstream.

It should be noted that after obtaining the quasi time domain sequence and the reordering information, the quasi time domain sequence and the reordering information may be encoded to generate the bitstream. Here, the quasi time domain sequence may be represented by a YUV shape, that is, the quasi time domain sequence may also be referred to as a quasi time domain YUV sequence, and the quasi time domain sequence may include at least one sequence, and a reference relationship exists between feature sub-maps in each of the at least one sequence; and the reordering information is configured to indicate a reference relationship between the feature sub-maps in the quasi time domain sequence.

It should also be noted that besides information required to be encoded by the encoder includes the quasi time domain sequence and the reordering information, a tensor shape of the input feature map data needs to be written into the bitstream. Therefore, in some embodiments, the method may further include the following operation.

A tensor shape of the input feature map data is written into the bitstream, here the tensor shape includes a number of channels and a feature tensor size, and the feature tensor size includes a height and width of the feature tensor.

Here, the tensor shape is a feature tensor shape and is represented by (C, W, H). Here, C is a number of channels, W is the width of the feature tensor, H is the height of the feature tensor, and W and H mentioned here are feature tensor sizes.

Furthermore, the reordering information may also be recorded in supplemental enhancement information (SEI).

The SEI may be SEI in VVC and HEVC, or extension data of the AVS standard. Therefore, in some embodiments, the method may further include the following operations.

SEI configured to record the reordering information, is determined.

The SEI is written into the bitstream.

Exemplarily, it is sei_payload (.) of sei_message (.) in sei_rbsp (.) of AVC/HEVC/VVC/EVC. More specifically, as shown in Table 1 and Table 2, a new SEI category, i.e., SEI message of feature_map_reorder_indication (.), is added. For the new SEI category, payloadType may be defined as any serial number which is not used by any other SEI, such as 183, and at this time, a syntax structure is shown in Table 1, and Table 2 shows a specific description of syntax elements of the reordering information.

TABLE 1

| | Descriptor |
|---|---|
| sei_payload( payloadType, payloadSize ) { | |
|   if( nal_unit_type = = PREFIX_SEI_NUT ) { | |
|     if( payloadType = = 0) | |
|       buffering_period( payloadSize ) | |
|     ... | |
|     if( payloadType = = 183 ) | |
|       feature_map_reorder_indication ( payloadSize ) | |
|     } | |
| } | |

TABLE 2

| | Descriptor |
|---|---|
| feature_map_reorder_indication ( payloadSize ) { | |
|   order_key_feature_channel_minus1 | ue(v) |
|   num_lists_of_key_feature_channel_minus1 | ue(v) |
|   for( i = 0; i <= | |
|   num_lists_of_key_feature_channel_minus1; i++ ) { | |
|     num_channels_of_list_minus1[ i ] | ue(v) |
|     for ( j = 0; j <= num_channels_of_list_minus1[ i ]; j++ ) { | |
|       order_non_key_feature_channel_minus1[ i ][ j ] | ue(v) |
|     } | |
|   } | |
| } | |

Semantics of syntax elements are:
(1) order_key_feature_channel_minus1: describing that a channel serial number of the center point feature sub-map is order_key_feature_channel_minus1+1;
(2) num_lists_of_key_feature_channel_minus1: describing that a total number of sequences corresponding to the center point feature sub-map is num_lists_of_key_feature_channel_minus1+1;
(3) num_channels_of_list_minus1 [i]: describing that a number of feature sub-maps in an i-th sequence is num_channels_of_list_minus1 [i]+1;
(4) order_non_key_feature_channel_minus1 [i][j]: describing that a channel serial number of a j-th feature sub-map in the i-th sequence is order_non_key_feature_channel_minus1 [i][j]+1.

Furthermore, the information required to be encoded by the encoder may further include: a size of an image of an input network, represented by $image_{size}$; and a size of the image of the input network processed by an original network, represented by $image_{processed\_size}$, so that a back-end network extracts a target box of the image.

The embodiment provides an encoding method, in which input feature map data is determined; relevant processing is performed on the input feature map data, to obtain multiple feature sub-maps; multiple feature sub-maps are reordered, to obtain a quasi time domain sequence and corresponding reordering information; and the quasi time domain sequence and the reordering information are encoded, to generate a bitstream. In this way, multiple feature sub-maps are reordered, correlation information between the feature sub-maps is fully utilized, and a reference relationship between the feature sub-maps may be optimized, so that not only compression efficiency of the feature map data is improved, but also encoding and decoding efficiencies of the feature map data are improved.

In another embodiment of the disclosure, a decoding method provided in the embodiment of the disclosure is applied to a video decoding device, i.e., a decoder. Functions implemented by the method may be implemented by a second processor in the decoder calling a computer program, of course, the computer program may be stored in a second memory, and it may be seen that the decoder includes at least the second processor and the second memory.

Figure 4:
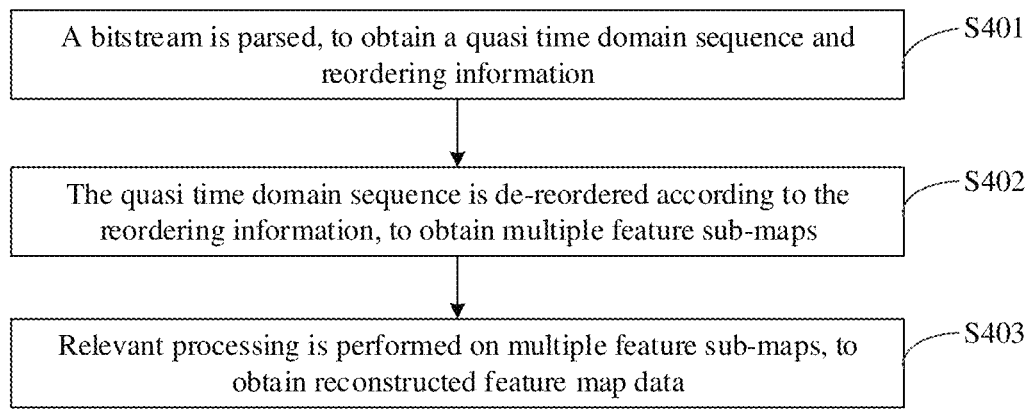
FIG. 4 is a schematic flowchart of a decoding method according to an embodiment of the disclosure.

With reference to FIG. 4, there is illustrated a schematic flowchart of a decoding method according to an embodiment of the disclosure. As illustrated in FIG. 4, the method may include the following operations S401 to S403.

In operation S401, a bitstream is parsed, to obtain a quasi time domain sequence and reordering information.

It should be noted that the decoding method may be applicable to a decoder of an H.265/HEVC standard, or applicable to a decoder of an H.266/VVC standard, or even applicable to decoders of other standards, such as a decoder of an AVS standard, a decoder of an EVC standard, or the like, which are not specifically limited in the embodiments of the disclosure.

It should also be noted that the quasi time domain sequence may be directly obtained by parsing the bitstream. Here, the quasi time domain sequence may be represented by a YUV shape, that is, the quasi time domain sequence may also be referred to as a quasi time domain YUV sequence, and the quasi time domain sequence may include at least one sequence, and a reference relationship exists between feature sub-maps in each of the at least one sequence; and the reordering information is configured to indicate a reference relationship between the feature sub-maps in the quasi time domain sequence.

The reordering information may also be directly obtained by parsing the bitstream. However, when the reordering information is recorded in SEI, in some embodiments, the operation of parsing the bitstream, to obtain reordering information may include the following operations.

The bitstream is parsed, to obtain SEI.

The reordering information is obtained from the SEI.

That is, the reordering information is recorded in the SEI. In this way, after obtaining the SEI by parsing the bitstream, the reordering information may be obtained from the SEI.

Here, the reordering information may include at least one list, and each of the at least one list stores channel serial numbers corresponding to feature sub-maps placed in each of the at least one sequence. The at least one list functions to guide establishment of a reference relationship between feature sub-maps when each of the at least one sequence is encoded and decoded. Specifically, feature sub-maps in the same sequence may refer to each other, and feature sub-maps in different sequences cannot refer to each other.

In operation S402, the quasi time domain sequence is de-reordered according to the reordering information, to obtain multiple feature sub-maps.

It should be noted that after obtaining the quasi time domain sequence and the reordering information, the quasi time domain sequence may be de-reordered according to the reordering information, to obtain multiple feature sub-maps, and multiple feature sub-maps are arranged according to an initial ordering mode.

Specifically, in some embodiments, the operation of de-reordering the quasi time domain sequence according to the reordering information, to obtain multiple feature sub-maps may include the following operations.

Shape conversion is performed on the quasi time domain sequence, to obtain at least one sequence in a feature sub-map shape.

The at least one sequence is de-reordered according to the reordering information, to obtain multiple feature sub-maps.

It should be noted that the quasi time domain sequence is represented by a YUV shape, at this time, it needs to be converted into a feature sub-map shape, to obtain at least one sequence in a feature sub-map shape, and each of the at least one sequence contains at least two feature sub-maps. Then, the at least one sequence is de-reordered according to the reordering information, to obtain multiple feature sub-maps, and multiple feature sub-maps are arranged according to an initial ordering mode.

It should also be noted that the initial ordering mode refers to arrangement according to an order of channel serial numbers. Since the reordering information may include at least one list, and each of the at least one list stores channel serial numbers corresponding to feature sub-maps placed in each of the at least one sequence. Therefore, in some embodiments, the operation of de-reordering the at least one sequence according to the reordering information, to obtain multiple feature sub-maps may include the following operations.

Feature sub-maps contained in the at least one sequence are reordered to channel positions corresponding to the channel serial numbers, according to channel serial numbers corresponding to feature sub-maps and stored in each of the at least one list, to obtain multiple feature sub-maps arranged according to an order of channel serial numbers.

That is, the decoded YUV sequence is converted back to the feature sub-map shape, and then it is de-reordered to an original channel order by using the reordering information (i.e., List$^I$[ ]), specific operations are as follows. A feature sub-map at a c-th bit in an I-th sequence is reordered to a channel position of an original feature sub-map of List$^I$[c], and multiple feature sub-maps arranged according to the channel serial numbers may be obtained.

In operation S403, relevant processing is performed on multiple feature sub-maps, to obtain reconstructed feature map data.

It should be noted that after obtaining multiple feature sub-maps, relevant processing may be performed on multiple feature sub-maps. The relevant processing may include dequantization processing, interception processing, shape conversion processing, or the like. Specifically, in some embodiments, the operation of performing relevant processing on multiple feature sub-maps, to obtain reconstructed feature map data may include the following operations.

Multiple feature sub-maps are converted from a feature sub-map shape into an array shape respectively, to obtain multiple third feature data, here each channel corresponds to a respective one of the third feature data, and the third feature data is in the array shape.

Multiple third feature data are intercepted respectively, to obtain multiple second feature data.

Multiple second feature data are dequantized respectively, to obtain multiple first feature data.

Multiple first feature data are converted from the array shape into a tensor shape respectively, to obtain multiple feature tensor data.

The reconstructed feature map data is obtained according to multiple feature tensor data.

It should be noted that since the feature sub-map is in the feature sub-map shape, the feature sub-map needs to be converted from the feature sub-map shape into the array shape at first, so that multiple third feature data may be obtained, here each channel corresponds to a respective one of the third feature data.

It should also be noted that for multiple third feature data, the third feature data corresponding to each channel is dequantized and intercepted, to obtain second feature data corresponding to each channel; then the second feature data corresponding to each channel is dequantized, to obtain first feature data corresponding to each channel; then the first feature data corresponding to each channel is converted from the array shape into the tensor shape, to obtain feature tensor data corresponding to each channel, so as to obtain multiple feature tensor data corresponding to multiple channels; and the reconstructed feature map data may be obtained according to multiple feature tensor data corresponding to multiple channels. That is, after obtaining the feature tensor data corresponding to each channel, since there are multiple channels, multiple feature tensor data corresponding to multiple channels may be obtained according to multiple third feature data, so that the reconstructed feature map data may be reconstructed. It should also be noted that here, not only the third feature data is in the array shape, but also each of the second feature data and the first feature data is in the array shape.

In some embodiments, the method may further include the following operations.

The bitstream is parsed, to obtain the tensor shape which includes a number of channels and a feature tensor size, and the feature tensor size includes a height and width of a feature tensor.

It should be noted that in the encoder, the tensor shape is written into the bitstream as the encoding information; then in the decoder, the tensor shape may be obtained by parsing the bitstream, and is represented by (C, W, H). Here C is a number of channels, W is a width of a feature tensor, H is a height of the feature tensor, and W and H mentioned here are feature tensor sizes.

Furthermore, the operation of intercepting multiple third feature data respectively, to obtain multiple second feature data may include the following operations.

Array data of the feature tensor size at a preset position is intercepted from the third feature data corresponding to each channel, and the intercepted array data is determined as second feature data corresponding to each channel, to obtain multiple second feature data.

It should be noted that the feature tensor size (H, W) may be obtained by parsing the bitstream, and the preset position may be located at an upper left corner of the second feature data. That is, after the shape conversion, an array size ($\hat{H}$, $\hat{W}$) corresponding to the third feature data may be obtained. Then, array data of the feature tensor size (H, W) is intercepted from the upper left corner of ($\hat{H}$, $\hat{W}$), and the intercepted array data is used as the second feature data corresponding to each channel, to obtain multiple second feature data.

Furthermore, in some embodiments, the operation of dequantizing multiple second feature data respectively, to obtain multiple first feature data may include the following operations.

The bitstream is parsed, to obtain a minimum value and a maximum value corresponding to each channel.

First feature data corresponding to each channel is determined by using a third calculation model according to second feature data corresponding to each channel, the minimum value and the maximum value, to obtain multiple first feature data.

It should be noted that for dequantization, in a specific example, the minimum value (represented by $x_{min}$) and the maximum value (represented by $x_{max}$) corresponding to each channel may be obtained by parsing the bitstream. In this way, the second feature data corresponding to each channel is read and dequantized. At this time, a dequantization formula (i.e., the third calculation model) is as follows.

$$x_{ij} = \frac{\hat{y}_{ij}(x_{max} - x_{min})}{2^n - 1} + x_{min} \qquad (7)$$

Here, $x_{ij}$ represents data at an i-th row and j-th column in an array (H, W) corresponding to the unquantized first feature data, $x_{min}$ represents a minimum value in the array (H, W) corresponding to the unquantized first feature data, $x_{max}$ represents a maximum value in the array (H, W) corresponding to the unquantized first feature data, $\hat{y}_{ij}$ represents data at an i-th row and j-th column in an array (H, W) corresponding to the quantized second feature data, n represents a number of bits.

In another specific example, a floating-point formula may be used at this time. Dequantization functions to convert fixed-point data into floating-point data. At this time, the dequantization formula may be replaced by a floating-point formula, and the floating-point formula is as follows.

$$x_{ij} = 2\left(\frac{x_{max}}{2^{(2^{BitDepth})}-1} \times float(\hat{y}_{ij})-1\right) \qquad (8)$$

Here, $x_{ij}$ represents data at an i-th row and j-th column in an array (H, W) corresponding to the unquantized first feature data, $\hat{y}_{ij}$ represents data at an i-th row and j-th column in an array (H, W) corresponding to the quantized second feature data, that is, $\hat{y}_{ij}$ and $x_{ij}$ represent fixed-point data and floating-point restored original data respectively, float (•) converts input data of an integer type into data of a floating-point type, BitDepth represents a number of fixed-point bits, $x_{max}$ represents a maximum value in the array (H, W) corresponding to the unquantized first feature data, here $x_{max}$ is obtained by parsing the bitstream.

That is, after shape conversion, the third feature data may be intercepted and dequantized, and the obtained first feature data in the array shape is converted into the tensor shape, to obtain the feature tensor data corresponding to each channel. It should be noted that during execution, interception and then dequantization processing may be performed, or dequantization and then interception processing may be performed, and the embodiments of the disclosure are described by example of interception and then dequantization, but the execution order is not specifically limited.

Furthermore, the operation of obtaining the reconstructed feature map data according to multiple feature tensor data may include the following operation.

Channel merging is performed on multiple feature tensor data according to the tensor shape, to obtain the reconstructed feature map data.

That is, the obtained multiple feature tensor data (H, W) are merged into a final desired tensor shape with a shape of (C, H, W) according to corresponding channels, that is, the tensor shape is the reconstructed feature map data based on reconstruction.

Furthermore, the information encoded by the encoder further includes: a size of an image of an input network, represented by $image_{size}$; and a size of the image of the input network processed by an original network, represented by $image_{processed\_size}$. At this time, in the decoder, for a network detecting a target box, $image_{size}$ and $image_{processed\_size}$ need to be obtained by parsing the bitstream, and then $image_{size}$ and $image_{processed\_size}$ are input into a subsequent network, so that a back-end network extracts a target box of the image.

Briefly, in the embodiment of the disclosure, the bitstream is parsed to obtain reordering information containing at least one list, the reordering information records channel serial numbers of feature sub-maps in the feature map data, the at least one list shares a central feature sub-map, and in each of the at least one list, a channel serial number of at least one feature sub-map is also recorded besides a channel serial number of a center point feature sub-map. The at least one list functions to guide establishment of a reference relationship between feature sub-maps when at least one sequence is encoded and decoded. Specifically, feature sub-maps in the same sequence may refer to each other, and feature sub-maps in different sequences cannot refer to each other. The center point feature sub-map is used as a feature sub-map shared by the at least one list, and can be referred by other feature sub-maps only, but cannot refer to other feature sub-maps. In this way, the feature sub-maps are de-reordered according to the reordering information of the feature sub-maps and the quasi time domain sequence obtained by decoding, to obtain reconstructed feature map data which includes feature data of all channels.

The embodiment provides a decoding method, in which a bitstream is parsed, to obtain a quasi time domain sequence and reordering information; the quasi time domain sequence is de-reordered according to the reordering information, to obtain multiple feature sub-maps; and relevant processing is performed on multiple feature sub-maps, to obtain reconstructed feature map data. In this way, multiple feature sub-maps are reordered at the encoder, and then de-reordering is performed progressively at the decoder. Since correlation information between the feature sub-maps is fully utilized, a reference relationship between the feature sub-maps may be optimized, so that not only compression efficiency of the feature map data is improved, but also encoding and decoding efficiencies of the feature map data are improved.

Figure 5:
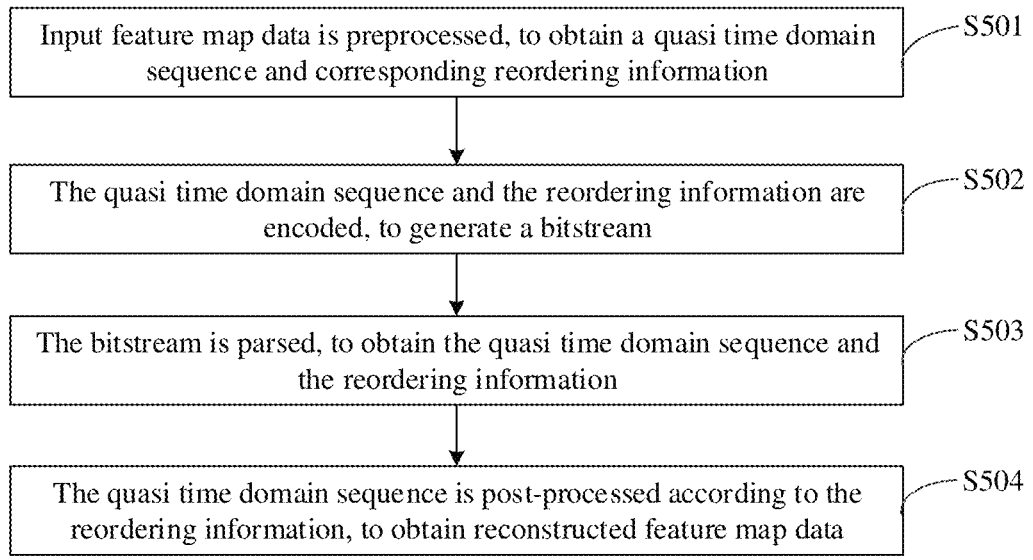
FIG. 5 is a schematic detailed flowchart of quasi time domain feature encoding and decoding according to an embodiment of the disclosure.

In yet another embodiment of the disclosure, with reference to FIG. 5, there is illustrated a schematic detailed flowchart of a quasi time domain feature encoding and decoding process according to an embodiment of the disclosure. As illustrated in FIG. 5, the detailed flowchart may include the following operations S501 to S504.

In operation S501, input feature map data is preprocessed, to obtain a quasi time domain sequence and corresponding reordering information.

In operation S502, the quasi time domain sequence and the reordering information are encoded, to generate a bitstream.

In operation S503, the bitstream is parsed, to obtain the quasi time domain sequence and the reordering information.

In operation S504, the quasi time domain sequence is post-processed according to the reordering information, to obtain reconstructed feature map data.

Here, operations S501 and S502 are executed by an encoder, and after generating a bitstream, the bitstream is transmitted by the encoder to a decoder. After receiving the bitstream, the decoder may perform operations S503 and S504 to obtain the reconstructed feature map data.

It may be understood that the embodiment of the disclosure provide a quasi time domain feature encoding technology. Here, the feature specifically refers to feature data output by a network intermediate layer after an image or a video is input into a preset neural network model. For an image with a width W1 and a height H1, size of its corresponding feature data may be represented in a tensor shape (C, W, H). Here C is a number of channels, H is a height of a feature tensor size, W is a width of the feature tensor size.

Figure 6:
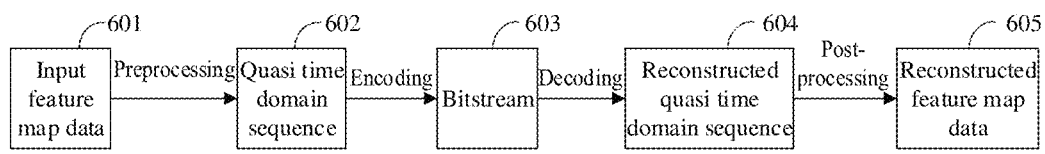
FIG. 6 is a schematic structural diagram of a quasi time domain feature encoding and decoding framework according to an embodiment of the disclosure.

It should be noted that a basic idea of the quasi time domain feature encoding technology is illustrated in FIG. 6, which shows a schematic structural diagram of a quasi time domain feature encoding and decoding framework according to an embodiment of the disclosure. In FIG. 6, the encoding and decoding framework may include input feature map data 601, a quasi time domain sequence 602, a bitstream 603, a reconstructed quasi time domain sequence 604, and reconstructed feature map data 605. The input feature map data 601 includes feature data of multiple channels, and each of the quasi time domain sequence 602 and the reconstructed quasi time domain sequence 604 is a YUV sequence. Based on the encoding and decoding framework illustrated in FIG. 6, the following operations may be specifically included.

(1) Preprocessing: the input feature map data 601 is preprocessed, to obtain the quasi time domain sequence 602.

(2) Encoding: the quasi time domain sequence 602 and the preprocessed reordering information thereof are encoded, to obtain the bitstream 603.

(3) Decoding: the received bitstream is parsed, to obtain the reconstructed quasi time domain sequence 604.

(4) Post-processing: the reconstructed reordering information is obtained according to parsing thereof, and the reconstructed quasi time domain sequence 604 is post-processed, to obtain the reconstructed feature map data 605, and the reconstructed feature map data 605 is used in a subsequent network to perform intelligent task processing.

More specifically, the above operations may also be further subdivided, and each of the operations will be described in detail below.

Figure 7:
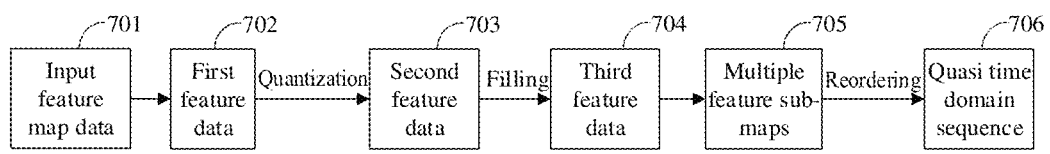
FIG. 7 is a schematic structural diagram of a preprocessing operation framework according to an embodiment of the disclosure.

(1) Preprocessing: FIG. 7 shows a schematic structural diagram of a preprocessing operation framework according to an embodiment of the disclosure. As illustrated in FIG. 7, the preprocessing operation framework may include input feature map data 701, first feature data 702, second feature data 703, third feature data 704, multiple feature sub-maps 705, and a quasi time domain sequence 706. The input feature map data 701 may be converted into an array shape through shape conversion, to obtain the first feature data 702. Then, the first feature data 702 may be quantized, to obtain the second feature data 703. Then, the second feature data 703 may be filled, to obtain the third feature data 704. The third feature data 704 may be converted from an array shape into a feature sub-map shape, to obtain multiple feature sub-maps 705. Then, multiple feature sub-maps 705 may be reordered, to obtain the quasi time domain sequence 706, i.e., a YUV sequence.

Specifically, the quantized array (H, W) of each channel (C) is filled with duplicated boundary values on the right side and bottom of the array, and the filling formula is as illustrated in the above formula (3). Then, the quantized and filled array of each channel is converted into the feature sub-map shape, and feature sub-maps of each channel are clustered and reordered (as illustrated in FIG. 3), and the reordered feature sub-maps are synthesized into a quasi time domain YUV sequence.

Besides the reordering operation, in some cases, the preprocessing may further include operation of converting features from the tensor shape into the array shape, operation of quantizing the feature data, or the like. Details of specific operations of quantization refer to the foregoing contents, and are not elaborated here.

(2) Encoding: information required to be encoded by the encoder may include a quasi time domain YUV sequence and at least other additional data included. The at least other additional data included may be a feature tensor shape represented by (C, H, W); or may be reordering information (for example, storing information in form of a list) represented by $List^i[c]=X$.

Furthermore, other possible information included are: a size of an image of an input network, represented by $image_{size}$; a size of the image of the input network processed by an original network, represented by $image_{processed\_size}$; and a minimum value and a maximum value corresponding to each channel of the feature tensor, represented by $x_{min}$ and $x_{max}$ respectively.

(3) Decoding: information required to be decoded by the decoder may include a reconstructed quasi time domain YUV sequence and at least other decoded information included. The at least other decoded information included may be a feature tensor shape represented by (C, H, W); or may be reordering information (for example, storing information in form of a list) represented by $List^i[c]=X$.

In a possible implementation, the reordering information may also be recorded in SEI, such as SEI of VVC and HEVC, or extension data of the AVS standard. Exemplarily, it is sei_payload (.) of sei_message (.) in sei_rbsp (.) of AVC/HEVC/VVC/EVC. More specifically, as illustrated in the above Table 1 and Table 2, a new SEI category, i.e., SEI message of feature_map_reorder_indication (.), is added. Table 1 and Table 2 provide a syntax structure and a specific description of syntax elements respectively, and are not elaborated here.

Furthermore, other possible information included after parsing the bitstream are: a size of an image of an input network, represented by $image_{size}$; a size of the image of the input network processed by an original network, represented by $image_{processed\_size}$; and a minimum value and a maximum value corresponding to each channel of the feature tensor, represented by $x_{min}$ and $x_{max}$ respectively.

Figure 8:
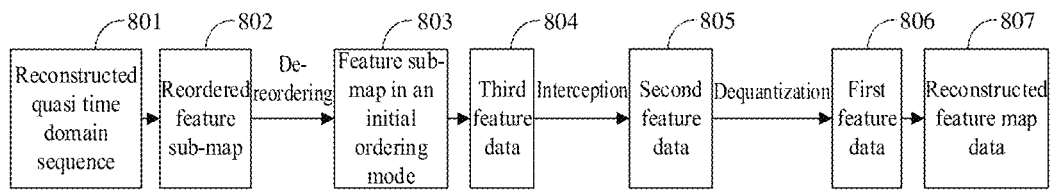
FIG. 8 is a schematic structural diagram of a post-processing operation framework according to an embodiment of the disclosure.

(4) Post-processing: FIG. 8 shows a schematic structural diagram of a post-processing operation framework according to an embodiment of the disclosure. As illustrated in FIG. 8, the post-processing operation framework may include a reconstructed quasi time domain sequence 801, a reordered feature sub-map 802, a feature sub-map 803 in an initial ordering mode, third feature data 804, second feature data 805, first feature data 806, and reconstruction feature map data 807. The reconstructed quasi time domain sequence 801 is a YUV sequence, and the reconstructed quasi time domain sequence 801 is converted into a feature sub-map shape at first, to obtain a reordered feature sub-map 802. The reordered feature sub-map 802 may be de-reordered, to obtain the feature sub-map 803 in the initial ordering mode, i.e., multiple feature sub-maps arranged according to the order of channels. Then, shape conversion is performed on the feature sub-map, to obtain the third feature data 804 in an array shape. Then, the third feature data 804 is intercepted, to obtain the intercepted second feature data 805, and then the intercepted second feature data may be dequantized, to obtain the unquantized first feature data 806. The first feature data 806 is converted from an array shape into a tensor shape, and merged into the final reconstructed feature map data 807 with a tensor shape represented as (C, H, W).

Specifically, the decoded YUV sequence is converted back to the feature sub-map shape, and then the feature sub-maps is de-reordered to an original channel order by using the reordering information ($List^l[\ ]$), that is, a feature sub-map at a c-th bit in an l-th sequence is reordered to a channel position of an original feature sub-map of $List^l[c]$; then, the feature sub-map at the c-th bit after de-reordering is read in the array shape; the read array is intercepted, for example, array data of the original feature tensor size (H, W) at the upper left corner there are intercepted; the intercepted array is dequantized; and then, the dequantized array is converted back to a feature tensor (H, W) of a c-th channel, and feature tensors (H, W) of multiple channels are merged into a final feature tensor according to corresponding channels, to obtain the final reconstructed feature map data with a tensor shape of (C, H, W). Alternatively, operations of dequantization and then interception may also be performed, that is, after reading the feature sub-map at the c-th bit after de-reordering in the array shape, the read array is dequantized; then, array data of the original feature tensor size (H, W) is intercepted from the upper left corner of the dequantized array (Ĥ, Ŵ), and then the intercepted array is converted back to the feature tensor (H, W) of the c-channel, merged into a final feature tensor according to corresponding channels, to obtain the final reconstructed feature map data.

Finally, for a network detecting a target, information $image_{size}$ and $image_{processed\_size}$ obtained by parsing the bitstream need to be input into a subsequent network, so that a back-end network extracts a target box of the image.

Based on this, core ideas of the embodiments of the disclosure are: reordering feature sub-maps of all channels in feature data of multiple channels into a quasi time domain feature sequence, to perform compression by using methods for encoding and decoding videos; and in order to recover, after decoding, feature data of multiple channels before reordering, the reordering information also needs to be recorded in the bitstream. Furthermore, during encoding and decoding, the feature sub-maps may refer to each other to improve the compression efficiency by using inter prediction, therefore, a reference relationship between the feature sub-maps may be optimized, so that the compression efficiency is optimal. At this time, construction of the reference relationship may be guided and constrained according to the reordering information. Specifically, the reordering information may include multiple lists, each of the lists records numbers of at least two feature sub-maps in at least one sequence and original channel serial numbers thereof (for recovery of reordering), feature sub-maps in the same sequence may refer to each other, and feature sub-maps in different sequences may not refer to each other. In this way, reordering information of feature sub-maps with similar contents may be described in a sequence, and reordering information of feature sub-maps with large different contents are described in different sequences, to ensure reference between similar feature sub-maps and avoid reference between large different feature sub-maps, so that the encoding efficiency may be improved.

Specifically, in the embodiments of the disclosure, the bitstream may be decoded to obtain at least one sequence of feature sub-maps, and each image in the at least one sequence is data of at least one channel of the feature data, that is, a feature sub-map. Furthermore, the bitstream is decoded to obtain reordering information including multiple lists, the reordering information records channel serial numbers of feature sub-maps in the input feature map data, multiple list share a center point feature sub-map, and in each of the lists, a channel serial number of at least one feature sub-map is recorded besides a channel serial number of the center point feature sub-map. Multiple lists function to guide establishment of a reference relationship between feature sub-maps when at least one sequence is encoded and decoded. Specifically, feature sub-maps in the same sequence may refer to each other, and feature sub-maps in different sequences cannot refer to each other. The center point feature sub-map is used as a feature sub-map shared by multiple list, and can be referred by other feature sub-maps only, but cannot refer to other feature sub-maps. Therefore, the feature sub-maps are de-reordered according to the reordering information of the feature sub-maps and the quasi time domain sequence obtained by decoding, to obtain reconstructed feature map data which includes feature data of all channels.

Specific implementations of the foregoing embodiments are described in detail through the above embodiments, and it may be seen therefrom that according to technical solutions of the foregoing embodiments, multiple feature sub-maps are reordered, correlation information between the feature sub-maps is fully utilized, so that inter encoding may improve the encoding efficiency, while compression of the feature map data is also achieved.

Figure 9:
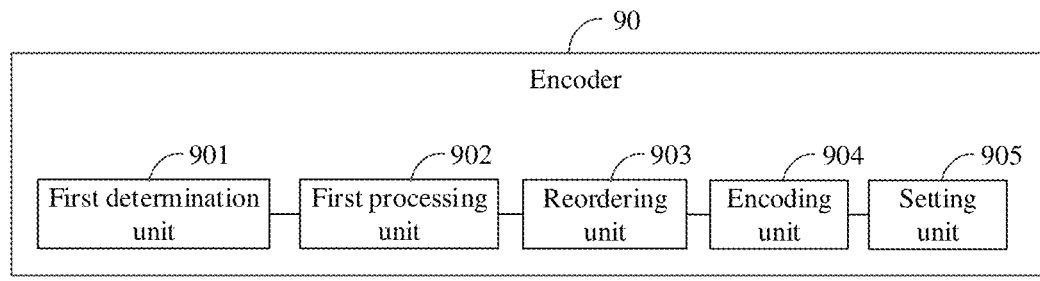
FIG. 9 is a schematic diagram of a composition structure of an encoder according to an embodiment of the disclosure.

Based on the same inventive concept as the foregoing embodiments, with reference to FIG. 9, there is illustrated a schematic diagram of a composition structure of an encoder 900 according to an embodiment of the disclosure. As illustrated in FIG. 9, the encoder 90 may include a first determination unit 901, a first processing unit 902, a reordering unit 903, and an encoding unit 904.

The first determination unit 901 is configured to determine input feature map data.

The first processing unit 902 is configured to perform relevant processing on the input feature map data, to obtain multiple feature sub-maps.

The reordering unit 903 is configured to reorder multiple feature sub-maps, to obtain a quasi time domain sequence and corresponding reordering information.

The encoding unit 904 is configured to encode the quasi time domain sequence and the reordering information, to generate a bitstream.

In some embodiments, the first determination unit 901 is specifically configured to: obtain a to-be-processed image; and perform feature extraction on the to-be-processed image through a preset neural network model, to obtain the input feature map data which includes feature data of multiple channels.

In some embodiments, the first processing unit 902 is further configured to, when the input feature map data is in a tensor shape: perform shape conversion on the feature data of multiple channels in the input feature map data respectively, to obtain multiple first feature data, here each channel corresponds to a respective one of the first feature data, and the first feature data is an array shape.

The first determination unit 901 is further configured to determine multiple first feature data as the input feature map data.

In some embodiments, the first processing unit 902 is further configured to: quantize multiple first feature data respectively, to obtain multiple second feature data; fill multiple second feature data respectively, to obtain multiple third feature data; and perform shape conversion on multiple third feature data respectively, to obtain multiple feature sub-maps.

Furthermore, the first processing unit 902 is specifically configured to: select a minimum value and a maximum value from the first feature data corresponding to each channel, based on multiple first feature data; and determine second feature data corresponding to each channel by using a first calculation model according to the first feature data corresponding to each channel, the minimum value and the maximum value, to obtain multiple second feature data.

Furthermore, the first processing unit 902 is specifically configured to fill second feature data corresponding to each channel by using a second calculation model based on multiple second feature data, and determine third feature data corresponding to each channel, to obtain multiple third feature data.

Furthermore, the first processing unit 902 is specifically configured to convert third feature data corresponding to each channel from an array shape to a feature sub-map shape based on multiple third feature data, and determine a feature sub-map corresponding to each channel, to obtain multiple feature sub-maps.

In some embodiments, the encoding unit 904 is further configured to write the minimum value and the maximum value corresponding to each channel, into the bitstream.

In some embodiments, with reference to FIG. 9, the encoder 90 may further include a setting unit 905 configured to set an initial ordering mode of multiple feature sub-maps as an arrangement according to an order of channel serial numbers.

In some embodiments, the reordering unit 903 is specifically configured to: determine a target feature sub-map from multiple feature sub-maps, and set the target feature sub-map as an element at a zeroth bit of each of at least one sequence; determine a (i+1)-th remaining feature sub-map set which includes remaining feature sub-maps except feature sub-maps arranged at first i bits of each of the at least one sequence, i is an integer greater than or equal to 0; in response to the (i+1)-th remaining feature sub-map set being not empty, calculate a distance value between each feature sub-map in the (i+1)-th remaining feature sub-map set and a feature sub-map arranged at an i-th bit of each of the at least one sequence, determine at least one feature sub-map according to multiple calculated distance values, and correspondingly set the determined at least one feature sub-map as an element at a (i+1)-th bit of each of the at least one sequence; after operating i to become i+1, return to the operation of determining the (i+1)-th remaining feature sub-map set, until the (i+1)-th remaining feature sub-map set is empty; and after obtaining the at least one sequence with a feature sub-map shape, perform shape conversion on the at least one sequence, to obtain the quasi time domain sequence.

Furthermore, the reordering unit 903 is specifically configured to, when i is equal to 0, determine a first remaining feature sub-map set which includes remaining feature sub-maps except the target feature sub-map; and calculate a distance value between each feature sub-map in the first remaining feature sub-map set and the target feature sub-map, determine at least one feature sub-map according to multiple calculated distance values, and correspondingly set the determined at least one feature sub-map as an element at a first bit of each of the at least one sequence.

In some embodiments, the first determination unit 901 is further configured to: cluster multiple feature sub-maps, to obtain at least one class; determine a center point of each of the at least one class, to obtain at least one center point; determine a center point feature sub-map from multiple feature sub-maps according to the at least one center point, here the center point feature sub-map represents a feature sub-map in multiple feature sub-maps which has a minimum distance value from a center point of the at least one center point; and determine the center point feature sub-map as the target feature sub-map.

In some embodiments, the setting unit 905 is further configured to: set at least one list, each of which stores channel serial numbers corresponding to feature sub-maps placed in each of the at least one sequence; and obtain the reordering information according to the at least one list.

In some embodiments, the first determination unit 901 is further configured to determine SEI configured to record the reordering information.

The encoding unit 904 is further configured to write the SEI into the bitstream.

In some embodiments, the encoding unit 904 is further configured to: write the tensor shape of the input feature map data into the bitstream, here the tensor shape includes a number of channels and a feature tensor size, and the feature tensor size includes a height and width of a feature tensor.

It may be understood that in the embodiment of the disclosure, "unit" may be part of a circuit, part of a processor, part of a program or software, or the like, and of course, may also be a module, or may be non-modular. Furthermore, components in the embodiment may be integrated into a processing unit, or each of the units may physically exist alone, or two or more units may be integrated into a unit. The integrated unit may be implemented in form of hardware, or may be implemented in form of a software function module.

When the integrated unit is implemented in form of a software function module rather than sold or used as an independent product, the integrated unit may be stored in a computer-readable storage medium. Based on such an understanding, the technical solution of the embodiment substantially or parts making contributions to the related art, or all or part of the technical solution may be embodied in form of a software product, and the computer software product is stored in a storage medium, including several instructions configured to enable a computer device (which may be a personal computer, a server, a network device, or the like) or a processor to execute all or part of operations of the method in the embodiment. The foregoing storage medium includes various media capable of storing program codes, such as a USB flash disk, a mobile hard disk, a Read Only Memory (ROM), a Random Access Memory (RAM), a magnetic disk, or an optical disk, or the like.

Therefore, an embodiment of the disclosure provides a computer storage medium, applied to the encoder 90. The computer storage medium stores a computer program, and when the computer program is executed by a first processor, the method according to any one of the foregoing embodiments is implemented.

Figure 10:
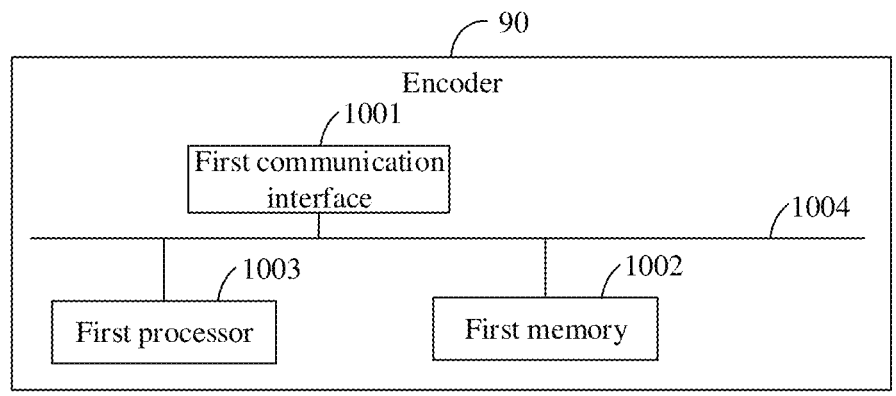
FIG. 10 is a schematic diagram of a hardware structure of an encoder according to an embodiment of the disclosure.

Based on the composition of the encoder 90 and the computer storage medium, with reference to FIG. 10, there is illustrated a schematic diagram of a hardware structure of an encoder 90 according to an embodiment of the disclosure. As illustrated in FIG. 10, the hardware structure may include a first communication interface 1001, a first memory 1002 and a first processor 1003, these components are coupled together by a first bus system 1004. It may be understood that the first bus system 1004 is configured to implement connection and communication between these components. The first bus system 1004 further includes a power bus, a control bus, and a state signal bus, besides a data bus. However, various buses are marked as the first bus system 1004 in FIG. 10, for clarity of illustration.

The first communication interface 1001 is configured to receive and transmit a signal in a process of transceiving information between the encoder and other external network elements.

The first memory 1002 is configured to store a computer program executable on the first processor 1003.

The first processor 1003 is configured to, when executing the computer program:

determine input feature map data;

perform relevant processing on the input feature map data, to obtain multiple feature sub-maps;

reorder multiple feature sub-maps, to obtain a quasi time domain sequence and corresponding reordering information; and encode the quasi time domain sequence and the reordering information, to generate a bitstream.

It may be understood that the first memory 1002 in the embodiment of the disclosure may be a volatile memory or a non-volatile memory, or may include both volatile and non-volatile memories. The non-volatile memory may be ROM, a programmable ROM (PROM), an Erasable PROM (EPROM), an Electrically EPROM (EEPROM), or a flash memory. The volatile memory may be RAM which is used as an external cache. By way of exemplary rather than restrictive descriptions, many forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM) and a Direct Rambus RAM (DR RAM). The first memory 1002 of the systems and methods described in the disclosure is intended to include, but is not limited to, these and any other suitable type of memories.

Furthermore, the first processor 1003 may be an integrated circuit chip with a signal processing capability. During implementation, operations of the foregoing methods may be completed by an integrated logical circuit in a hardware form in the first processor 1003 or an instruction in a software form. The first processor 1003 may be a general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component, or the like. The methods, operations and logical block diagrams disclosed in the embodiments of the disclosure may be implemented or performed. The general-purpose processor may be a microprocessor, or the processor may be any conventional processor or the like. Operations of the methods disclosed in combination with the embodiments of the disclosure may be directly embodied to be executed and completed by a hardware decoding processor or executed and completed by a combination of hardware in the decoding processor and software modules. The software module may be located in a mature storage medium in the art, such as RAM, a flash memory, ROM, PROM, EEPROM, a register, or the like. The storage medium is located in the first memory 1002, and the first processor 1003 reads information in the first memory 1002, and completes operations of the above methods in combination with the hardware thereof.

It may be understood that these embodiments described in the disclosure may be implemented by hardware, software, firmware, middleware, microcode, or a combination thereof. For implementation based on hardware, the processing unit may be implement in one or more ASICs, DSP, a DSP Device (DSPD), a Programmable Logic Device (PLD), FPGA, a general-purpose processor, a controller, a microcontroller, a microprocessor, other electronic units configured to perform the functions described in the disclosure, or a combination thereof. For implementation based on software, technologies described in the disclosure may be implemented by modules (e.g., processes, functions, or the like) performing the functions described in the disclosure. Software codes may be stored in the memory and executed by the processor. The memory may be implemented in the processor or outside the processor.

Optionally, in another embodiment, the first processor 1003 is further configured to perform the method according to any one of the foregoing embodiments when executing the computer program.

The embodiment provides an encoder which may include a first determination unit, a first processing unit, a reordering unit, and an encoding unit. The first determination unit is configured to determine input feature map data. The first processing unit is configured to perform relevant processing on the input feature map data, to obtain multiple feature sub-maps. The reordering unit is configured to reorder multiple feature sub-maps, to obtain a quasi time domain sequence and corresponding reordering information. The encoding unit is configured to encode the quasi time domain sequence and the reordering information, to generate a bitstream. In this way, correlation information between the feature sub-maps is fully utilized by recording the feature sub-maps, so that the encoding efficiency may be improved, while compression of the feature map data is also achieved.

Figure 11:
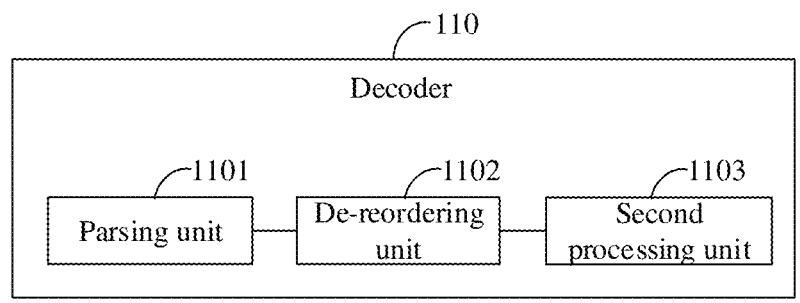
FIG. 11 is a schematic diagram of a composition structure of a decoder according to an embodiment of the disclosure.

Based on the same inventive concept as the foregoing embodiments, with reference to FIG. 11, there is illustrated a schematic diagram of a composition structure of a decoder 110 according to an embodiment of the disclosure. As illustrated in FIG. 11, the decoder 110 may include a parsing unit 1101, a de-reordering unit 1102, and a second processing unit 1103.

The parsing unit 1101 is configured to parse a bitstream, to obtain a quasi time domain sequence and reordering information.

The de-reordering unit 1102 is configured to de-reorder the quasi time domain sequence according to the reordering information, to obtain multiple feature sub-maps.

The second processing unit 1103 is configured to perform relevant processing on multiple feature sub-maps, to obtain reconstructed feature map data.

In some embodiments, the parsing unit 1101 is further configured to parse the bitstream, to obtain SEI; and obtain the reordering information from the SEI.

In some embodiments, the de-reordering unit 1102 is specifically configured to perform shape conversion on the quasi time domain sequence, to obtain at least one sequence in a feature sub-map shape; and de-reorder the at least one sequence according to the reordering information, to obtain multiple feature sub-maps.

In some embodiments, the reordering information includes at least one list, each of which stores channel serial numbers corresponding to feature sub-maps placed in each of the at least one sequence.

Furthermore, the de-reordering unit 1102 is specifically configured to reorder, according to channel serial numbers corresponding to feature sub-maps and stored in each of the at least one list, feature sub-maps contained in the at least one sequence to channel positions corresponding to the channel serial numbers, to obtain multiple feature sub-maps arranged according to an order of channel serial numbers.

In some embodiments, the second processing unit 1103 is further configured to: convert multiple feature sub-maps from a feature sub-map shape to an array shape respectively, to obtain multiple third feature data, here each channel corresponds to a respective one of the third feature data, and the third feature data is in the array shape; and intercept multiple third feature data respectively, to obtain multiple second feature data; dequantize multiple second feature data respectively, to obtain multiple first feature data; convert multiple first feature data from the array shape to a tensor shape respectively, to obtain multiple feature tensor data; and obtain the reconstructed feature map data according to multiple feature tensor data.

Furthermore, the parsing unit 1101 is further configured to parse the bitstream, to obtain the tensor shape which includes a number of channels and a feature tensor size, and the feature tensor size includes a height and width of a feature tensor.

The second processing unit 1103 is specifically configured to intercept array data of the feature tensor size at a preset position from the third feature data corresponding to each channel, and determine the intercepted array data as second feature data corresponding to each channel, to obtain multiple second feature data.

Furthermore, the parsing unit 1101 is further configured to parse the bitstream, to obtain a minimum value and a maximum value corresponding to each channel.

The second processing unit 1103 is specifically configured to determine, first feature data corresponding to each channel by using a third calculation model according to second feature data corresponding to each channel, the minimum value and the maximum value, to obtain multiple first feature data.

Furthermore, the second processing unit 1103 is specifically configured to perform channel merging on multiple feature tensor data according to the tensor shape to obtain the reconstructed feature map data.

It may be understood that in the embodiment, "unit" may be part of a circuit, part of a processor, part of a program or software, or the like, and of course, may also be a module, or may be non-modular. Furthermore, components in the embodiment may be integrated into a processing unit, or each of the units may physically exist alone, or two or more units may be integrated into a unit. The integrated unit may be implemented in form of hardware, or may be implemented in form of a software function module.

When the integrated unit is implemented in form of a software function module rather than sold or used as an independent product, the integrated unit may be stored in a computer-readable storage medium. Based on such an understanding, the embodiment provides a computer storage medium, applied to the decoder 110. The computer storage medium stores a computer program, and when the computer program is executed by a second processor, the method according to any one of the foregoing embodiments is implemented.

Figure 12:
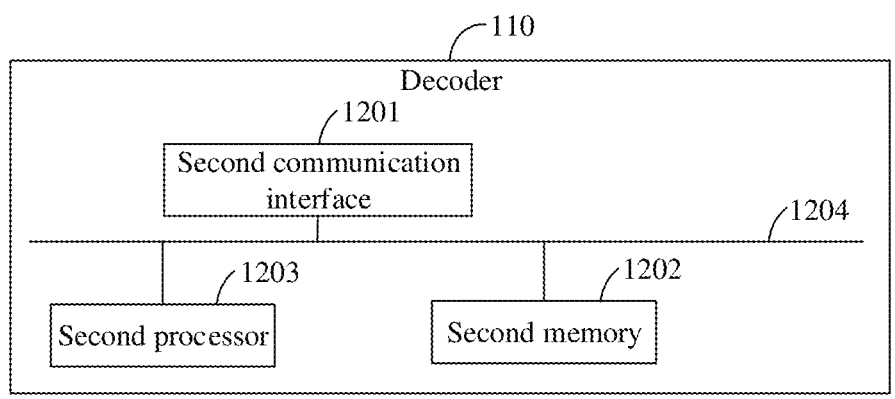
FIG. 12 is a schematic diagram of a hardware structure of a decoder according to an embodiment of the disclosure.

Based on the composition of the decoder 110 and the computer storage medium, with reference to FIG. 12, there is illustrated a schematic diagram of a hardware structure of a decoder 110 according to an embodiment of the disclosure. As illustrated in FIG. 12, the hardware structure may include a second communication interface 1201, a second memory 1202 and a second processor 1203, these components are coupled together by a second bus system 1204. It may be understood that the second bus system 1204 is configured to implement connection and communication between these components. The second bus system 1204 further includes a power bus, a control bus, and a state signal bus, besides a data bus. However, various buses are marked as the second bus system 1204 in FIG. 12, for clarity of illustration.

The second communication interface 1201 is configured to receive and transmit a signal in a process of transceiving information between the decoder and other external network elements.

The second memory 1202 is configured to store a computer program executable on the second processor 1203.

The second processor 1203 is configured to, when executing the computer program:

parse a bitstream, to obtain a quasi time domain sequence and reordering information; and de-reorder the quasi time domain sequence according to the reordering information, to obtain multiple feature sub-maps; and perform relevant processing on multiple feature sub-maps, to obtain reconstructed feature map data.

Optionally, in another embodiment, the second processor 1203 is further configured to perform the method according to any one of the foregoing embodiments when executing the computer program.

It may be understood that the second memory 1202 is similar to the first memory 1002 in terms of hardware functions, and the second processor 1203 is similar to the first processor 1003 in terms of hardware functions, which are not described in detail here.

The embodiment provides a decoder which may include a parsing unit, a de-reordering unit, and a second processing unit. The parsing unit is configured to parse a bitstream, to obtain a quasi time domain sequence and reordering information. The de-reordering unit is configured to de-reorder the quasi time domain sequence according to the reordering information, to obtain multiple feature sub-maps. The second processing unit is configured to perform relevant processing on multiple feature sub-maps, to obtain reconstructed feature map data. In this way, multiple feature sub-maps are reordered at the encoder, and then de-reordering is performed progressively at the decoder. Since correlation information between the feature sub-maps is fully utilized, a reference relationship between the feature sub-maps may be optimized, so that not only compression efficiency of the feature map data is improved, but also encoding and decoding efficiencies of the feature map data are improved.

It should be noted that in the disclosure, terms "include", "contain" or any other variants thereof are intended to cover a non-exclusive inclusion, so that a process, method, article or device including a series of elements not only includes those elements, but also includes other elements which are not listed explicitly, or elements inherent to such a process, method, article or device. In the absence of more limitations, an element defined by a statement "includes a" does not exclude presence of other same elements in the process, method, article or device including the element.

Serial numbers of the embodiments of the disclosure are merely for description, and do not represent advantages and disadvantages of the embodiments.

Methods disclosed in several method embodiments of the disclosure may be arbitrarily combined without conflict, to obtain a new method embodiment.

Features disclosed in several product embodiments of the disclosure may be arbitrarily combined without conflict, to obtain a new product embodiment.

Features disclosed in several method or device embodiments of the disclosure may be arbitrarily combined without conflict, to obtain a new method or device embodiment.

Contents as described above are merely specific embodiments of the disclosure, however, the scope of protection of the disclosure is not limited thereto. Any variation or replacement apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

In the embodiments of the disclosure, during encoding, input feature map data is determined; relevant processing is performed on the input feature map data, to obtain multiple feature sub-maps; multiple feature sub-maps are reordered, to obtain a quasi time domain sequence and corresponding reordering information; and the quasi time domain sequence and the reordering information are encoded, to generate a bitstream. During decoding, a bitstream is parsed, to obtain a quasi time domain sequence and reordering information; the quasi time domain sequence is de-reordered according to the reordering information, to obtain multiple feature sub-maps; and relevant processing is performed on multiple feature sub-maps, to obtain reconstructed feature map data. In this way, multiple feature sub-maps are reordered, correlation information between the feature sub-maps is fully utilized, and a reference relationship between the feature sub-maps may be optimized, so that not only compression efficiency of the feature map data is improved, but also encoding and decoding efficiencies of the feature map data are improved.

What is claimed is:

1. An encoding method, applied to an encoder, comprising:
   determining input feature map data;
   performing relevant processing on the input feature map data, to obtain a plurality of feature sub-maps, wherein the relevant processing comprises quantization processing, filling processing and shape conversion processing;
   reordering the plurality of feature sub-maps, to obtain a quasi time domain sequence and corresponding reordering information; and
   encoding the quasi time domain sequence and the reordering information, to generate a bitstream.

2. The method of claim 1, wherein determining the input feature map data comprises:
   obtaining a to-be-processed image; and
   performing feature extraction on the to-be-processed image through a preset neural network model, to obtain the input feature map data which comprises feature data of a plurality of channels.

3. The method of claim 2, further comprising when the input feature map data is in a tensor shape:
   performing shape conversion on the feature data of the plurality of channels in the input feature map data respectively, to obtain a plurality of first feature data, wherein each channel corresponds to a respective one of the first feature data, and the first feature data is an array shape; and
   determining the plurality of first feature data as the input feature map data;
   wherein the method further comprises:
   writing the tensor shape of the input feature map data into the bitstream, wherein the tensor shape comprises a number of channels and a feature tensor size, and the feature tensor size comprises a height and width of a feature tensor.

4. The method of claim 3, wherein performing relevant processing on the input feature map data, to obtain the plurality of feature sub-maps comprises:
   quantizing the plurality of first feature data respectively, to obtain a plurality of second feature data;
   filling the plurality of second feature data respectively, to obtain a plurality of third feature data; and
   performing shape conversion on the plurality of third feature data respectively, to obtain the plurality of feature sub-maps.

5. The method of claim 4, wherein quantizing the plurality of first feature data respectively, to obtain the plurality of second feature data comprises:
   selecting a minimum value and a maximum value from the first feature data corresponding to each channel, based on the plurality of first feature data; and
   determining second feature data corresponding to each channel by using a first calculation model according to the first feature data corresponding to each channel, the minimum value and the maximum value, to obtain the plurality of second feature data;
   wherein the method further comprises:
   writing the minimum value and the maximum value corresponding to each channel, into the bitstream.

6. The method of claim 4, wherein filling the plurality of second feature data respectively, to obtain the plurality of third feature data comprises:
   filling second feature data corresponding to each channel by using a second calculation model based on the plurality of second feature data, and determining third feature data corresponding to each channel, to obtain the plurality of third feature data.

7. The method of claim 4, wherein performing shape conversion on the plurality of third feature data respectively, to obtain the plurality of feature sub-maps comprises:
   converting third feature data corresponding to each channel from an array shape into a feature sub-map shape based on the plurality of third feature data, and determining a feature sub-map corresponding to each channel, to obtain the plurality of feature sub-maps.

8. The method of claim 1, further comprising after obtaining the plurality of feature sub-maps:
   setting an initial ordering mode of the plurality of feature sub-maps as an arrangement according to an order of channel serial numbers.

9. The method of claim 1, wherein reordering the plurality of feature sub-maps, to obtain the quasi time domain sequence comprises:
   determining a target feature sub-map from the plurality of feature sub-maps, and setting the target feature sub-map as an element at a zeroth bit of each of at least one sequence;

determining a (i+1)-th remaining feature sub-map set which comprises remaining feature sub-maps except feature sub-maps arranged at first i bits of each of the at least one sequence, wherein i is an integer greater than or equal to 0;

in response to the (i+1)-th remaining feature sub-map set being not empty, calculating a distance value between each feature sub-map in the (i+1)-th remaining feature sub-map set and a feature sub-map arranged at an i-th bit of each of the at least one sequence, determining at least one feature sub-map according to a plurality of calculated distance values, and correspondingly setting the determined at least one feature sub-map as an element at a (i+1)-th bit of each of the at least one sequence;

after operating i to become i+1, returning to the step of determining the (i+1)-th remaining feature sub-map set, until the (i+1)-th remaining feature sub-map set is empty; and after obtaining the at least one sequence with a feature sub-map shape, performing shape conversion on the at least one sequence, to obtain the quasi time domain sequence.

10. The method of claim 9, wherein correspondingly setting the determined at least one feature sub-map as the element at the (i+1)-th bit of each of the at least one sequence comprises when i is equal to 0:

determining a first remaining feature sub-map set which comprises remaining feature sub-maps except the target feature sub-map; and calculating a distance value between each feature sub-map in the first remaining feature sub-map set and the target feature sub-map, determining at least one feature sub-map according to a plurality of calculated distance values, and correspondingly setting the determined at least one feature sub-map as an element at a first bit of each of the at least one sequence.

11. The method of claim 9, wherein determining the target feature sub-map from the plurality of feature sub-maps comprises:

clustering the plurality of feature sub-maps, to obtain at least one class;

determining a center point of each of the at least one class, to obtain at least one center point;

determining a center point feature sub-map from the plurality of feature sub-maps according to the at least one center point, wherein the center point feature sub-map represents a feature sub-map in the plurality of feature sub-maps which has a minimum distance value from a center point of the at least one center point; and determining the center point feature sub-map as the target feature sub-map.

12. The method of claim 9, further comprising:

setting at least one list, each of which stores channel serial numbers corresponding to feature sub-maps placed in each of the at least one sequence; and obtaining the reordering information according to the at least one list;

wherein the method further comprises:

determining supplemental enhancement information (SEI) configured to record the reordering information; and writing the SEI into the bitstream.

13. An encoder, comprising:

a first memory configured to store a computer program executable on a first processor; and the first processor configured to perform the method of claim 1 when executing the computer program.

14. A decoding method, applied to a decoder, comprising:

parsing a bitstream, to obtain a quasi time domain sequence and reordering information;

de-reordering the quasi time domain sequence according to the reordering information, to obtain a plurality of feature sub-maps; and performing relevant processing on the plurality of feature sub-maps, to obtain reconstructed feature map data, wherein the relevant processing comprises interception processing, dequantization processing, shape conversion processing and merge processing.

15. The method of claim 14, wherein parsing the bitstream, to obtain the reordering information comprises:

parsing the bitstream, to obtain supplemental enhancement information (SEI); and obtaining the reordering information from the SEI;

wherein de-reordering the quasi time domain sequence according to the reordering information, to obtain the plurality of feature sub-maps comprises:

performing shape conversion on the quasi time domain sequence, to obtain at least one sequence in a feature sub-map shape; and de-reordering the at least one sequence according to the reordering information, to obtain the plurality of feature sub-maps.

16. The method of claim 15, wherein the reordering information comprises at least one list, each of which stores channel serial numbers corresponding to feature sub-maps placed in each of the at least one sequence, de-reordering the at least one sequence according to the reordering information, to obtain the plurality of feature sub-maps comprises:

reordering, according to channel serial numbers corresponding to feature sub-maps and stored in each of the at least one list, feature sub-maps contained in the at least one sequence to channel positions corresponding to the channel serial numbers, to obtain the plurality of feature sub-maps arranged according to an order of channel serial numbers.

17. The method of claim 14, wherein performing relevant processing on the plurality of feature sub-maps, to obtain reconstructed feature map data comprises:

converting the plurality of feature sub-maps from a feature sub-map shape into an array shape respectively, to obtain a plurality of third feature data, wherein each channel corresponds to a respective one of the third feature data, and the third feature data is in the array shape; and intercepting the plurality of third feature data respectively, to obtain a plurality of second feature data;

dequantizing the plurality of second feature data respectively, to obtain a plurality of first feature data;

converting the plurality of first feature data from the array shape into a tensor shape respectively, to obtain a plurality of feature tensor data; and obtaining the reconstructed feature map data according to the plurality of feature tensor data.

18. The method of claim 17, further comprising:

parsing the bitstream, to obtain the tensor shape which comprises a number of channels and a feature tensor size, wherein the feature tensor size comprises a height and width of a feature tensor, wherein intercepting the plurality of third feature data respectively, to obtain the plurality of second feature data comprises:

intercepting array data of the feature tensor size at a preset position from the third feature data corresponding to each channel, and determining the intercepted array data as second feature data corresponding to each channel, to obtain the plurality of second feature data;

wherein obtaining the reconstructed feature map data according to the plurality of feature tensor data comprises:

performing channel merging on the plurality of feature tensor data according to the tensor shape, to obtain the reconstructed feature map data.

19. The method of claim 17, wherein dequantizing the plurality of second feature data respectively, to obtain the plurality of first feature data comprises:

parsing the bitstream, to obtain a minimum value and a maximum value corresponding to each channel; and determining first feature data corresponding to each channel by using a third calculation model based on the plurality of second feature data and according to second feature data corresponding to each channel, the minimum value and the maximum value, to obtain the plurality of first feature data.

20. A decoder, comprising:

a second memory configured to store a computer program executable on a second processor; and the second processor configured to perform the method of claim 14 when executing the computer program.

* * * * *